(12) United States Patent
Zhou et al.

(10) Patent No.: US 10,796,447 B2
(45) Date of Patent: Oct. 6, 2020

(54) IMAGE DETECTION METHOD, APPARATUS AND SYSTEM AND STORAGE MEDIUM

(71) Applicant: BEIJING KUANGSHI TECHNOLOGY CO., LTD., Beijing (CN)

(72) Inventors: Shuchang Zhou, Beijing (CN); Yi Yang, Beijing (CN); Lingwei Ma, Beijing (CN)

(73) Assignee: BEIJING KUANGSHI TECHNOLOGY CO., LTD., Beijing (CN)

( * ) Notice: Subject to any disclaimer, the term of this patent is extended or adjusted under 35 U.S.C. 154(b) by 100 days.

(21) Appl. No.: 16/175,269

(22) Filed: Oct. 30, 2018

(65) Prior Publication Data

US 2019/0244387 A1    Aug. 8, 2019

(30) Foreign Application Priority Data

Feb. 6, 2018    (CN) .......................... 2018 1 0118765

(51) Int. Cl.
| | |
|---|---|
| *G06T 7/73* | (2017.01) |
| *H04N 19/59* | (2014.01) |
| *G06T 3/40* | (2006.01) |
| *G06K 9/46* | (2006.01) |
| *G06K 9/36* | (2006.01) |
| *G06K 9/00* | (2006.01) |

(52) U.S. Cl.
CPC ............ *G06T 7/73* (2017.01); *G06K 9/00369* (2013.01); *G06K 9/36* (2013.01); *G06K 9/4642* (2013.01); *G06T 3/4007* (2013.01); *H04N 19/59* (2014.11)

(58) Field of Classification Search
CPC ...... H04N 19/23; H04N 19/167; H04N 19/59; G06T 2207/10016; G06T 2207/20064; G06T 2207/20081; G06T 2207/20084; G06T 7/73; G06T 3/4007; G06K 9/00711; G06K 9/00228; G06K 9/00369; G06K 9/4642; G06K 9/6203
See application file for complete search history.

(56) References Cited

U.S. PATENT DOCUMENTS

| | | | | |
|---|---|---|---|---|
| 6,185,343 | B1 * | 2/2001 | Ikeda | G06K 9/6203 |
| | | | | 382/291 |
| 6,801,665 | B1 * | 10/2004 | Atsumi | H04N 19/70 |
| | | | | 375/E7.056 |
| 7,949,042 | B2 * | 5/2011 | Fukuhara | G06K 9/00711 |
| | | | | 375/240 |
| 2008/0037837 | A1 * | 2/2008 | Noguchi | G06K 9/00335 |
| | | | | 382/118 |
| 2008/0298634 | A1 * | 12/2008 | Harada | H04N 1/32229 |
| | | | | 382/100 |

(Continued)

*Primary Examiner* — Jingge Wu
(74) *Attorney, Agent, or Firm* — Hamre, Schumann, Mueller & Larson, P.C.

(57) ABSTRACT

Embodiments of the present disclosure provide an image detection method, apparatus and system and a non-volatile storage medium. The image detection method includes: compressing an initial image to obtain a compressed image; performing a target detection on the compressed image to obtain a first position information of a target object in the compressed image; and determining a second position information of the target object in the initial image based on the first position information.

10 Claims, 3 Drawing Sheets

(56) References Cited

U.S. PATENT DOCUMENTS

| | | | |
|---|---|---|---|
| 2015/0178953 A1* | 6/2015 | Gao | G06K 9/00664 |
| | | | 345/681 |
| 2015/0242694 A1* | 8/2015 | Miyagawa | B60R 1/00 |
| | | | 382/103 |
| 2016/0275354 A1* | 9/2016 | Andalo | H04N 19/124 |
| 2017/0132472 A1* | 5/2017 | Tao | G06T 7/248 |
| 2017/0134746 A1* | 5/2017 | Lawrence | G06T 5/50 |
| 2018/0061199 A1* | 3/2018 | Sakomizu | H04N 19/82 |
| 2018/0240249 A1* | 8/2018 | Uchigaito | G06K 9/00362 |

* cited by examiner

IMAGE DETECTION METHOD, APPARATUS AND SYSTEM AND STORAGE MEDIUM

CROSS-REFERENCE TO RELATED APPLICATION

The application claims priority to Chinese patent application No. 201810118765.3, filed Feb. 6, 2018, titled "Image Detection Method, Apparatus and System and Storage Medium", the disclosure of which is incorporated herein by reference in its entirety as part of the application.

TECHNICAL FIELD

The present disclosure relates to the technical field of image processing, in particular to an image detection method, an image detection apparatus and an image detection system and a storage medium.

BACKGROUND

In recent years, target detection has been widely used in many fields, including face recognition of the security field, pedestrian detection, traffic detection, and the like, and it can be said that the target detection has been applied to every aspect of people's daily life. It is because of the wide application that different application scenarios put forward higher requirements for target detection technologies, especially for the image quality. For example, when performing the face detection, users want to get high-quality face detection results, and high-quality outputs depend on high-quality inputs, but high-quality images tend to take up more computations and storage space, which may reduce the overall performance of the detection system.

SUMMARY

Embodiments of the present disclosure provide an image detection method, apparatus and system and a non-volatile storage medium.

At least one embodiment of the present disclosure provides an image detection method. The image detection method includes: compressing an initial image to obtain a compressed image; performing a target detection on the compressed image to obtain a first position information of a target object in the compressed image; and determining a second position information of the target object in the initial image based on the first position information.

In the method according to some embodiments of the present disclosure, the first position information includes a coordinate of a first object frame for indicating a position of the target object in the compressed image, and determining the second position information of the target object in the initial image based on the first position information includes: mapping the first object frame to the initial image, based on the coordinate of the first object frame and a compression ratio between the initial image and the compressed image, to obtain a second object frame in the initial image corresponding to the first object frame; and obtaining a coordinate of the second object frame as the second position information.

The method according to some embodiments of the present disclosure further includes: extracting an image block comprising the target object from the initial image based on the second position information; and outputting the image block comprising the target object as an object image of the target object.

In the method according to some embodiments of the present disclosure, compressing the initial image to obtain the compressed image includes: compressing the initial image at a preset ratio to obtain the compressed image.

In the method according to some embodiments of the present disclosure, compressing the initial image to obtain the compressed image includes: compressing the initial image to a preset size to obtain the compressed image.

In the method according to some embodiments of the present disclosure, compressing the initial image to obtain the compressed image includes: resampling the initial image to obtain the compressed image.

The method according to some embodiments of the present disclosure, prior to compressing the initial image to obtain the compressed image, further includes: determining that a size of the initial image is above a size threshold.

At least one embodiment of the present disclosure provides an image detection apparatus, which includes: a compression module configured to compress an initial image to obtain a compressed image; a detection module configured to perform a target detection on the compressed image to obtain a first position information of a target object in the compressed image; and a position determining module configured to determine a second position information of the target object in the initial image based on the first position information.

At least one embodiment of the present disclosure provides an image detection system, which includes a processor and a memory, wherein the memory stores a computer program instruction, and the computer program instruction when executed by the processor, causes the processor to perform the image detection method according to at least one embodiment of the present disclosure.

The image detection system according to some embodiments of the present disclosure further includes a camera, wherein the camera includes an image sensor for capturing the initial image.

At least one embodiment of the present disclosure provides a non-volatile storage medium, storing a program instruction, the program instruction when executed by a computer, causing the computer to perform the image detection method according to at least one embodiment of the present disclosure.

BRIEF DESCRIPTION OF THE DRAWINGS

Detailed description will be given below to the exemplary embodiments with reference to the accompanying drawings to provide a more clear understanding of the objectives, the characteristics and the advantages of the present disclosure. The accompanying drawings are provided to further illustrate the embodiments of the present disclosure and constitute a part of the present disclosure. The accompanying drawings and the embodiments of the present disclosure are provided to illustrate the embodiments of the present disclosure and are not intended to limit the present disclosure. It should be noted that the same reference symbol is used in different drawings to designate the same component or step.

DETAILED DESCRIPTION

In order to make objects, technical solutions and advantages of the embodiments of the disclosure apparent more clear, the technical solutions of the embodiments will be described clearly and completely in conjunction with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Embodiments of the present disclosure provide an image detection method, an image detection apparatus and an image detection system, and a non-volatile storage medium. According to the embodiments of the present disclosure, an initial image (which may be a high-quality image, such as a 4K image) may be used as an input of the entire image detection system, the input image is compressed, the compressed image is used as an input of a target detection algorithm so that a target detection is performed thereon, the position of the target object in the compressed image is calculated, and then the position of the target object in the initial image is calculated based on the position of the target object in the compressed image. Compared to performing the target detection directly based on the initial image, the image detection method described above requires less computations, lower hardware requirements and lower cost. The image detection method and the image detection apparatus according to the embodiments of the present disclosure can be applied to any field which requires the detection of the target object, such as face detection, text detection, pedestrian detection, vehicle detection, and the like.

Firstly, an exemplary electronic device 100 for implementing an image detection method and an image detection apparatus according to some embodiments of the present disclosure is described with reference to FIG. 1.

Figure 1:
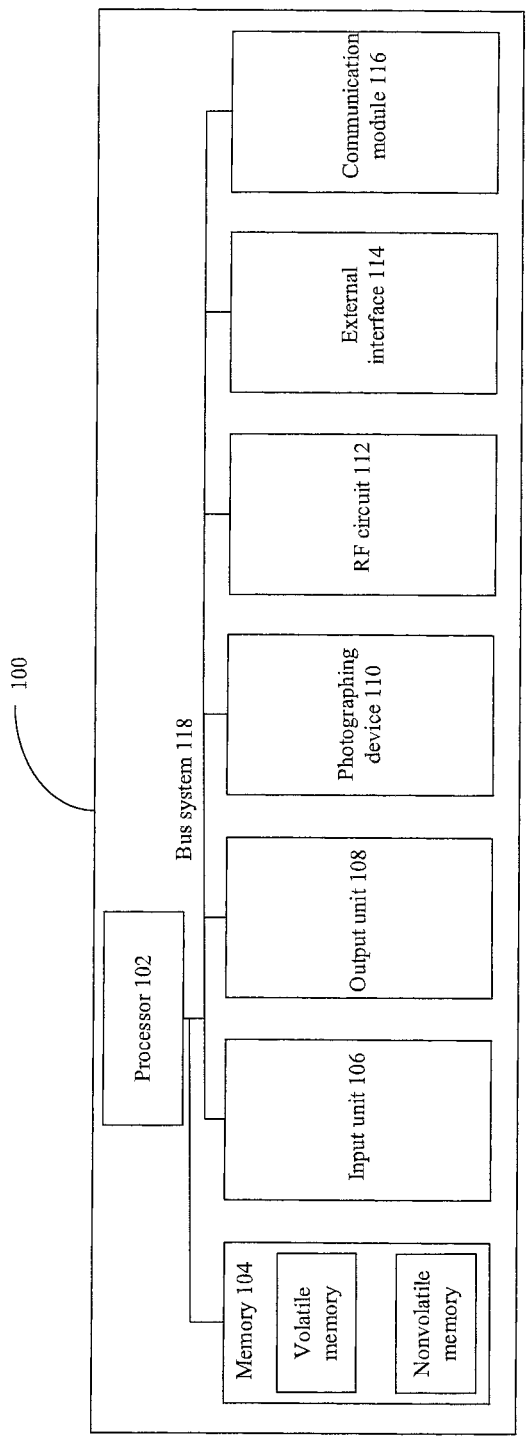
FIG. 1 is a schematic block diagram of an exemplary electronic device for implementing an image detection method and apparatus according to some embodiments of the present disclosure.

As shown in FIG. 1, the electronic device 100 includes one or more processors 102, and one or more memories 104. Optionally, the electronic device 100 may further include an input unit 106, an output unit 108, a photographing device 110, a radio-frequency (RF) circuit 112, an external interface 114 and a communication module 116, and these components are connected with each other through a bus system 118 and/or connecting mechanisms in other forms (not shown). It should be noted that the components and the structures of the electronic device 100 as shown in FIG. 1 are only illustrative and not limiting. The electronic device may also include other components and structures as required.

The processor 102 may be implemented by at least one of a digital signal processor (DSP), a field programmable gate array (FPGA), and a programmable logic array (PLA). For example, the processor 102 may be one or a combination of a central processing unit (CPU), a graphic processing unit (GPU), a tensor processing unit (TPU), an application-specific integrated circuit (ASIC) or a processing unit of other forms having data processing capabilities and/or instruction execution capabilities, and the processor 102 may control other components in the electronic device 100 to execute required functions.

The memory 104 may include one or more computer program products, and the computer program products may include various forms of computer readable storage mediums, e.g., volatile memories and/or nonvolatile memories. The volatile memory, for instance, may include a random access memory (RAM) and/or a cache. The nonvolatile memory, for instance, may include a read-only memory (ROM), a hard disk, a flash memory, etc. One or more computer program instructions may be stored in the computer readable storage medium. The processor 102 may execute the program instructions, so as to realize the client function as described below in the embodiments of the present disclosure (implemented by the processor) and/or other required functions. Various applications and various data, e.g., data used and/or produced by the applications, may also be stored in the computer readable storage medium.

The input unit 106 may be a device that is used by a user to input instructions, and may include one or more selected from a keyboard, a mouse, a microphone and a touch panel.

The output unit 108 may output various information (e.g., image and/or sound) to the outside (for instance, the user), and may include one or more of a display, a loudspeaker, etc. Optionally, the input unit 106 and the output unit 108 may be integrated together and implemented by the same interactive unit (e.g., a touch panel).

The photographing device 110 may capture the initial image and store the captured image in the memory 104 for the use of other components. The photographing device 110 may take various forms, such as a camera that is separately provided or a camera in a mobile terminal. It should be understood that the photographing device 110 is only an example, and the electronic device 100 may not include the photographing device 110. In this case, the initial image may be captured by other devices having image capturing capabilities, and the captured image may be transmitted to the electronic device 100 through a wired or wireless connection.

The RF (radio-frequency) circuit 112 receives and sends electromagnetic waves. The RF circuit 112 converts electrical signals into electromagnetic waves, or converts electromagnetic waves into electrical signals, and communicates with a communication network and other communication equipment through the electromagnetic waves. The RF circuit 112 may include known circuits for executing the functions, including but not limited to an antenna system, an RF transceiver, one or more amplifiers, a tuner, one or more oscillators, a DSP, a CODEC chip set, a subscriber identity module (SIM) card and a memory. The RF circuit 112 may communicate with the network and other devices through wireless communication. The network includes, for instance, the Internet, also referred to as the World Wide Web (WWW), an intranet and/or a wireless network such as a cellular telephone network, a wireless local area network (WLAN) and/or a metropolitan area network (MAN). The wireless communication may adopt any of a variety of communication standards, protocols and technologies, including but not limited to Global System for Mobile communications (GSM), Enhanced Data GSM Environment (EDGE), wideband code division multiple access (W-CDMA), code division multiple access (CDMA), time-division multiple address (TDMA), Bluetooth, Wireless Fidelity (Wi-Fi) (e.g., IEEE 802.11a, IEEE 802.11b, IEEE 802.11g and/or IEEE 802.11n), Voice over IP (VoIP), Wi- MAX, a protocol for email, instant messaging and/or Short Message Service (SMS), or any other suitable communication protocol, including communication protocols that have not been developed as of the filing date of this document.

The communication module 116 may communicate with other devices through one or more external interfaces 114, and may include a variety of software components for processing data received by the RF circuit 112 and/or the external interface 114. The external interface 114 (e.g., universal serial bus (USB) or FIREWIRE) is applicable to be directly or indirectly coupled to other devices via a network (such as the Internet or WLAN).

For example, the exemplary electronic device for implementing the image detection method and the image detection apparatus according to the embodiments of the present disclosure may be implemented on a device such as a tablet PC, a LAN server, a remote server, a cloud, and the like, and the embodiments of the present disclosure are not limited thereto.

Figure 2:
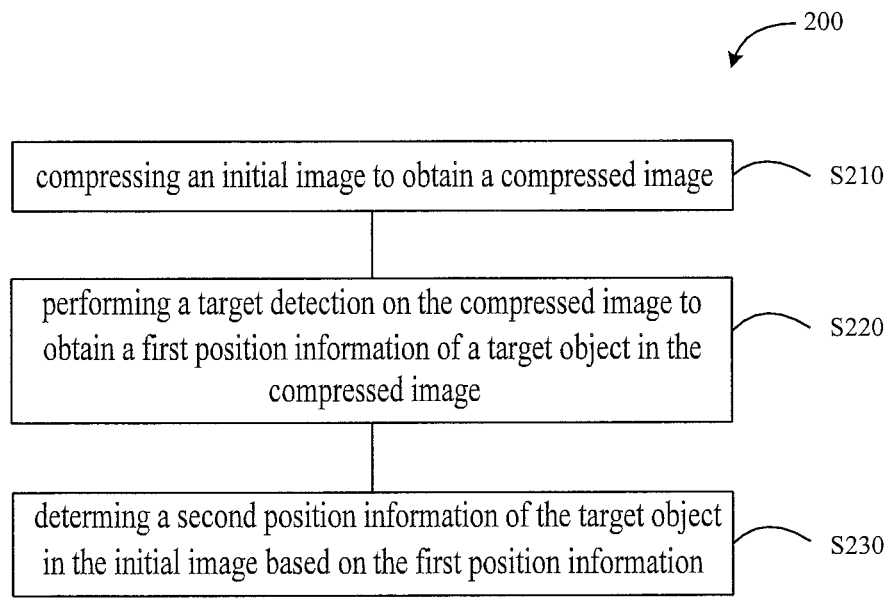
FIG. 2 is a schematic flowchart of an image detection method according to some embodiments of the present disclosure.

An image detection method according to some embodiments of the present disclosure will be described with reference to FIG. 2 in the following. FIG. 2 is a schematic flowchart of an image detection method 200 according to some embodiments of the present disclosure. As shown in FIG. 2, the image detection method 200 includes the following steps S210, S220 and S230.

S210: compressing an initial image to obtain a compressed image.

The initial image may be any image that requires the target detection. The initial image may be a static image or a frame of a video. The initial image may be an original image captured by the photographing device, or may be an image obtained by pre-processing (such as digitizing, normalizing, smoothing, etc.) the original image.

For example, the initial image may be a high-quality image, such as a 4K image. The criterion for distinguishing the high-quality image from the low-quality image may be preset, and for example, may include a full high definition (FHD, 1920×1080), an ultra-high definition (UHD, 3840× 2160) or a higher resolution image.

At step S210, the initial image may be compressed by any suitable image compression technique which is currently available or may occur in the future, allowing the size of the initial image to be reduced. Compared to the initial image, the compressed image requires less storage space, and the computations required to process the compressed image are also fewer.

For example, the step S210 may include: resampling the initial image to obtain the compressed image. For example, the initial image may be resampled by a nearest neighbor interpolation, a bilinear interpolation, a cubic convolution interpolation, or the like to obtain the compressed image. For example, the initial image may be averagely divided into a specific number of regions, and each region of the initial image corresponds to a pixel of the compressed image. The pixel values of all the pixels in each region of the initial image are averaged, and the obtained average is taken as the pixel value of the pixel of the compressed image corresponding to the region of the initial image, thereby obtaining the compressed image.

S220: performing a target detection on the compressed image to obtain a first position information of a target object in the compressed image.

The target object may be any object, including but not limited to a text, a specific pattern, a part of a person or a human body (such as a human face), an animal, a vehicle, a building, and the like. In the present disclosure, the target object is a specific object, and for example, assuming that the initial image is an image comprising a plurality of faces, the target object may be one of the plurality of faces.

The target detection refers to: providing an image (a static image or a video frame) as input information, determining the position and the size of the target object in the input image, and indicating the target object with an object frame having a moderate size on the image. The step S220 may be implemented by any existing or future target detection algorithm. For example, the target detection algorithm may be an algorithm based on a neural network, such as a faster R-CNN, SSD or R-FCN method.

For example, the neural network may be obtained in advance and trained by a data set, the compressed image is input into the trained neural network, and the neural network may output the position information of the target object. The position information of the target object described herein may include information on the object region where the target object is located. For example, the position information of the target object may be coordinates of four vertices of a rectangular frame (i.e., the object frame) comprising the target object, or the coordinate of at least one vertex of the rectangular frame and the width and the height of the rectangular frame. It can be understood that the size of the target object can be obtained according to the position information of the target object described herein. To distinguish the position information of the target object in the compressed image from the position information of the target object the initial image, the position information of the target object in the compressed image is referred to as the first position information, and the position information of the target object in the initial image is referred to as the second position information. It can be understood that the terms "first", "second", etc. as used in the present disclosure are not intended to indicate any sequence or other special meanings, but distinguish various components.

For example, the position of the object region where the target object is located may be detected, the object region may be indicated with the rectangular frame (i.e., the object frame), and the position information of the target object may be the coordinate information of the rectangular frame. The coordinate information of the rectangular frame may be represented by four numerical values, for example, the abscissa x of the upper left corner, the ordinate y of the upper left corner, the width w and the height h of the rectangular frame.

S230: determining a second position information of the target object in the initial image based on the first position information.

It can be understood that the pixels of the initial image and those of the compressed image have a correspondence, and the object frame comprising the target object in the compressed image is mapped to the initial image based on the first position information, so that the position of the target object in the initial image may be determined. For example, the step S230 may include: calculating the second position information based on the first position information and a compression ratio between the initial image and the compressed image. Specifically, based on the coordinate of the first object frame comprising the target object in the compressed image and the compression ratio between the initial image and the compressed image, the first object frame is mapped to the initial image to obtain the second object frame in the initial image corresponding to the first object frame, and the coordinate of the second object frame in the initial image is obtained as the second position information.

Figure 3:
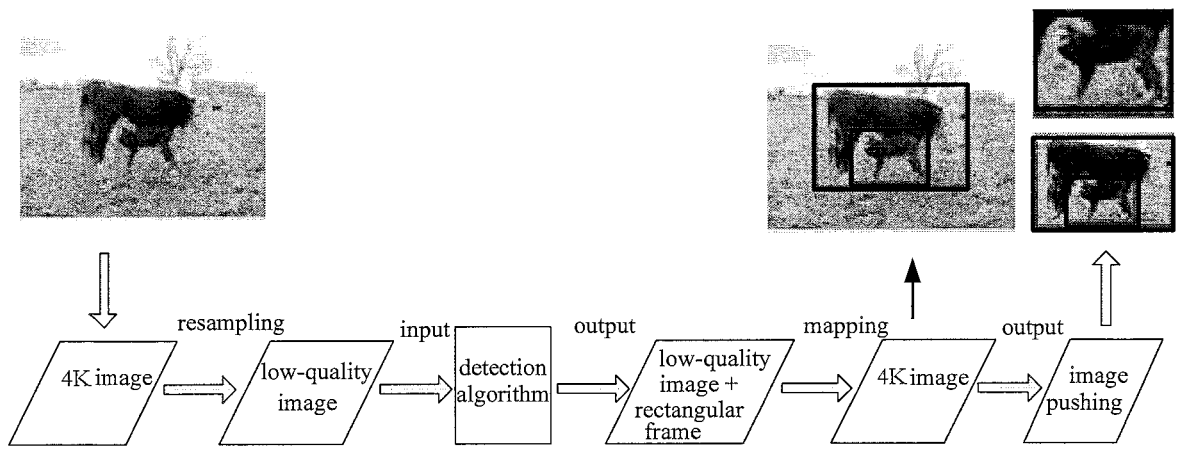
FIG. 3 is a schematic diagram of an image detection process according to some embodiments of the present disclosure.

FIG. 3 is a schematic diagram of an image detection process according to some embodiments of the present disclosure. As shown in FIG. 3, a 4K image (which can be a static image or a video frame) is initially provided. Subsequently, the 4K image is compressed into a low-quality image by resampling, for example, compressed into a 1080P image. Subsequently, the low-quality image is input into the target detection module to detect a target object in the low-quality image by using a target detection algorithm. Subsequently, the object frame detected in the low-quality image is mapped to the 4K image. Finally, optionally, the image block comprising the target object can be extracted from the 4K image, and the image block can be output as the object image. As described above, compared to the initial image, required computations of the compressed image are fewer. In addition, compared to the initial image, during the target detection of the compressed image, less intermediate data is generated and less storage space is required.

According to the image detection method provided by the embodiments of the present disclosure, the target detection is performed after the initial image is compressed, and the position of the target object in the initial image is determined based on the result of the target detection of the compressed image. Because the target detection is performed based on the compressed image instead of the initial image, the image detection method may reduce the computations and the storage space without affecting the detection accuracy of the target position of the initial image.

For example, the image detection method according to the embodiments of the present disclosure may be implemented in a device, apparatus, or system having a memory and a processor.

The image detection method according to the embodiments of the present disclosure may be disposed in a face image collection terminal, for example, may be disposed in an image collection terminal of the access control system in the security field; and may be disposed in a personal terminal in the financial field, such as a smart mobile phone, a tablet computer, a personal computer, etc.

Alternatively, the image detection method according to the embodiments of the present disclosure may also be distributed in a server terminal (or a cloud) and a personal terminal. For example, the initial image may be collected by the personal terminal, the personal teiininal transmits the collected image to the server terminal (or the cloud), and then the server terminal (or the cloud) performs the image detection.

According to the embodiments of the present disclosure, the image detection method 200 may further include: extracting an image block comprising the target object from the initial image based on the second position information; and outputting the image block comprising the target object as an object image of the target object.

After determining the coordinate of the object frame of the target object in the initial image, the image block comprising the target object may be cut out based on the object frame, the cut-out image block is output as a new image (referred to herein as the object image), and the output image may be stored locally or be transmitted to the server terminal, which can be referred to as image pushing. Referring to FIG. 3, the original 4K image comprises two target objects (a cow and a calf), and in the final step, two images of different sizes are cut out, in which the two target objects are respectively included. According to the embodiments of the present disclosure, the high-quality initial image may be input, the target detection is performed based on the low-quality compressed image, and then the image block comprising the target object is extracted from the high-quality initial image and is output. In this way, the target detection process with the high-quality image input and output can be implemented while occupying as few system resources as possible.

According to the embodiments of the present disclosure, the step S210 may include: compressing the initial image at a preset ratio to obtain the compressed image. In an example, the size of the initial image can be directly compressed to half the size, such as compressing a 4K image into a 1080P image, so that the computations required for the target detection can be reduced to a quarter.

According to the embodiments of the present disclosure, the step S210 may include: compressing the initial image to a preset size to obtain the compressed image.

The preset size may be any suitable size, which may be set as required, and the present disclosure is not limited thereto. For example, based on the computing capability of the image detection system, an appropriate image size that can be processed can be determined, and the size is taken as the preset size. For example, assuming that the image detection system can process 720P images at best the image can be directly compressed into a 720P image or smaller no matter how large the size of the initial image is.

According to the embodiments of the present disclosure, prior to the step S210, the image detection method 200 may further include: determining that a size of the initial image is above a size threshold. The step S210 is performed in case that the size of the initial image is above the size threshold.

The size threshold may be any suitable value, which may be set as required, and the present disclosure is not limited thereto. An appropriate threshold may be set as a criterion, and if the size of the initial image is not above the threshold, it can be considered that the required computations are not large, and the target detection may be directly performed on the initial image without being compressed.

Figure 4:
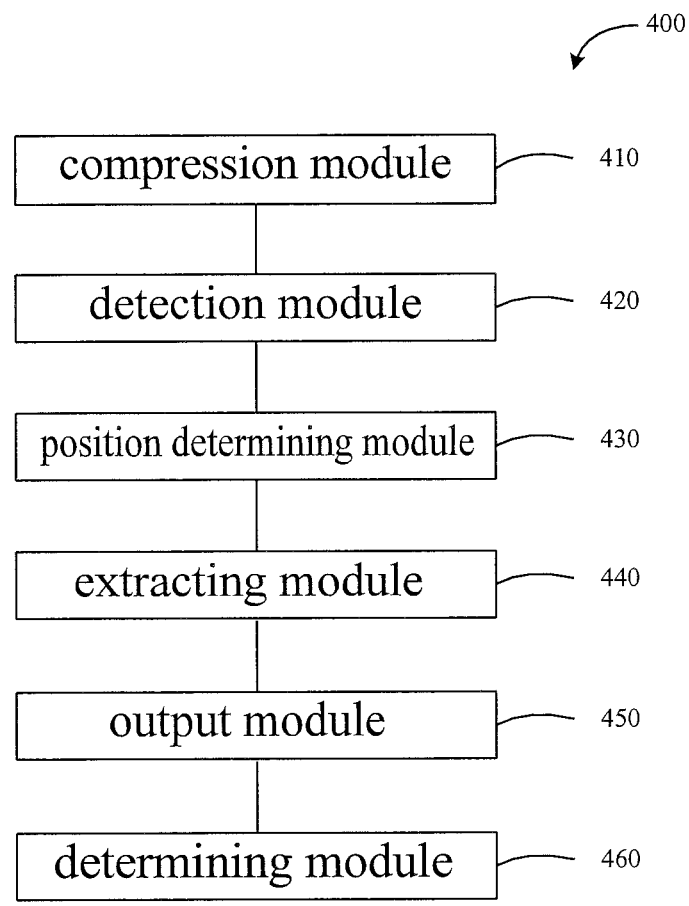
FIG. 4 is a schematic block diagram of an image detection apparatus according to some embodiments of the present disclosure.

According to another aspect of the present disclosure, an image detection apparatus is provided. FIG. 4 is a schematic block diagram of an image detection apparatus 400 according to some embodiments of the present disclosure.

As shown in FIG. 4, the image detection apparatus 400 according to the embodiments of the present disclosure includes a compression module 410, a detection module 420, and a position determining module 430. These modules may perform the various steps/functions of the image detection method described above in connection with FIGS. 2-3, respectively. Only the main functions of the individual components of the image detection apparatus 400 will be described in the following, and the details of which that have been described above are omitted.

The compression module 410 is configured to compress the initial image to obtain the compressed image. The compression module 410 may be implemented by the processor 102 of the electronic device as illustrated in FIG. 1 executing the program instructions stored in the memory 104.

The detection module 420 is configured to perform the target detection on the compressed image to obtain the first position information of the target object in the compressed image. The detection module 420 may be implemented by the processor 102 of the electronic device as illustrated in FIG. 1 executing the program instructions stored in the memory 104.

The position determining module 430 is configured to determine the second position information of the target object in the initial image based on the first position information. The position determining module 430 may be implemented by the processor 102 of the electronic device as illustrated in FIG. 1 executing the program instructions stored in the memory 104.

For example, the position determining module 430 is specifically configured to map the first object frame to the initial image, based on the coordinate of the first object frame and the compression ratio between the initial image and the compressed image, to obtain a second object frame in the initial image corresponding to the first object frame, and obtain the coordinate of the second object frame as the second position information.

For example, the image detection apparatus 400 further includes: an extracting module 440, which is configured to extract the image block comprising the target object from the initial image based on the second position information; and an output module 450, which is configured to output the image block comprising the target object as the object image of the target object.

For example, the compression module 410 is specifically configured to compress the initial image at a preset ratio to obtain the compressed image.

For example, the compression module 410 is specifically configured to compress the initial image to a preset size to obtain the compressed image.

For example, the compression module 410 is specifically configured to resample the initial image to obtain the compressed image.

For example, the image detection apparatus 400 further includes: a determining module 460, which is configured to determine whether the size of the initial image is above the size threshold before the compression module 410 compresses the initial image to obtain the compressed image, wherein the compression module 410 is activated in case that the size of the initial image is above the size threshold.

Those skilled in the art should understand that units and steps of the various examples described in connection with the embodiments of the present disclosure herein may be implemented by electronic hardware or a combination of computer software and electronic hardware. Whether these functions are performed in hardware or software depends on the specific application and design constraint conditions of the technical solutions. Those skilled in the art can use different methods to implement the described functions for each specific application, but the implementation should not be considered to go beyond the scope of the present disclosure.

Figure 5:
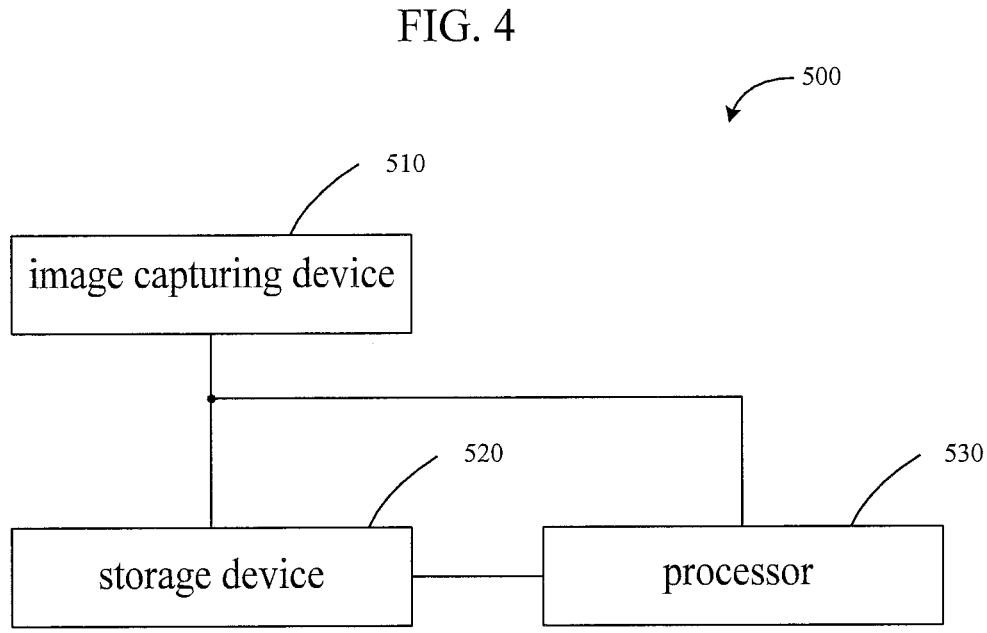
FIG. 5 is a schematic block diagram of an image detection system according to some embodiments of the present disclosure.

FIG. 5 is a schematic block diagram of an image detection system 500 according to some embodiments of the present disclosure. The image detection system 500 includes an image capturing device 510, a storage device (i.e., a memory) 520, and a processor 530.

The image capturing device 510 is configured to capture an initial image. The image capturing device 510 is optional, and the image detection system 500 may not include the image capturing device 510. In this case, the initial image may be captured and transmitted to the image detection system 500 by other photographing devices.

The storage device 520 is configured to store computer program instructions for implementing corresponding steps of the image detection method according to the embodiments of the present disclosure.

The processor 530 is configured to execute computer program instructions stored in the storage device 520 to perform corresponding steps of the image detection method according to the embodiments of the present disclosure.

In an embodiment, the computer program instructions when executed by the processor 530 causes the processor 530 to perform the following steps: compressing an initial image to obtain a compressed image; performing a target detection on the compressed image to obtain a first position information of the target object in the compressed image; and determining a second position information of the target object in the initial image based on the first position information.

For example, the image detection system 500 may include a camera, the camera may include an image sensor for capturing the initial image, the image sensor may be of various suitable types, including CMOS type, CCD type, etc., and the embodiments of the present disclosure are not limited thereto. In the present embodiment, the image sensor is the image capturing device 510 described above. Optionally, the camera may further include the storage device 520 and the processor 530 described above. For example, the camera is a face capturing camera.

For example, the first position information includes the coordinate of a first object frame for indicating the position of the target object in the compressed image, and when the computer program instructions are executed by the processor 530, the step of determining the second position information of the target object in the initial image based on the first position information includes: mapping the first object frame to the initial image based on the coordinate of the first object frame and the compression ratio between the initial image and the compressed image, to obtain a second object frame in the initial image corresponding to the first object frame; and obtaining the coordinate of the second object frame as the second position information.

For example, the computer program instructions when executed by the processor 530 cause the processor 530 to further perform the following steps: extracting an image block comprising the target object from the initial image based on the second position information; and outputting the image block comprising the target object as the object image of the target object.

For example, when the computer program instructions are executed by the processor 530, the step of compressing the initial image to obtain the compressed image includes: compressing the initial image at a preset ratio to obtain the compressed image.

For example, when the computer program instructions are executed by the processor 530, the step of compressing the initial image to obtain the compressed image includes: compressing the initial image to a preset size to obtain the compressed image.

For example, when the computer program instructions are executed by the processor 530, the step of compressing the initial image to obtain the compressed image includes: resampling the initial image to obtain the compressed image.

For example, the computer program instructions when executed by the processor 530 cause the processor 530 to further perform the following step, prior to the step of compressing the initial image to obtain the compressed image: determining that the size of the initial image is above the size threshold. The computer program instructions when executed by the processor 530 cause the processor 530 to perform the step of compressing the initial image to obtain the compressed image in case that the size of the initial image is above the size threshold.

In addition, according to the embodiments of the present disclosure, a storage medium is further provided, program instructions are stored in the storage medium, and the program instructions when executed by a computer or a processor cause the computer or the processor to perform corresponding steps of the image detection method provided by the embodiments of the present disclosure and to implement corresponding modules of the image detection apparatus according to the embodiments of the present disclosure. The storage medium, for example, may include a memory card of a smart mobile phone, a storage component of a tablet computer, a hard disk of a personal computer, a read-only memory (ROM), an erasable programmable read-only memory (EPROM), a compact disc read-only memory (CD-ROM), a USB memory, or any combination of the above storage mediums.

In an embodiment, the program instructions when executed by a computer or a processor may cause the computer or the processor to implement the various functional modules of the image detection apparatus according to the embodiments of the present disclosure, and/or may perform the image detection method according to the embodiments of the present disclosure.

In an embodiment, the program instructions when executed cause the following steps to be performed: compressing an initial image to obtain the compressed image; performing a target detection on the compressed image to obtain a first position information of the target object in the compressed image; and determining a second position information of the target object in the initial image based on the first position information.

For example, the first position information includes the coordinate of a first object frame for indicating the position of the target object in the compressed image, and when the program instructions are executed, the step of determining the second position information of the target object in the initial image based on the first position information includes: mapping the first object frame to the initial image based on the coordinate of the first object frame and a compression ratio between the initial image and the compressed image, to obtain a second object frame in the initial image corresponding to the first object frame; and obtaining the coordinate of the second object frame as the second position information.

For example, the program instructions when executed further cause the following steps to be performed: extracting an image block comprising the target object from the initial image based on the second position information; and outputting the image block comprising the target object as the object image of the target object.

For example, when the program instructions are executed, the step of compressing the initial image to obtain the compressed image includes: compressing the initial image at a preset ratio to obtain the compressed image.

For example, when the program instructions are executed, the step of compressing the initial image to obtain the compressed image includes: compressing the initial image to a preset size to obtain the compressed image.

For example, when the program instructions are executed, the step of compressing the initial image to obtain the compressed image includes: resampling the initial image to obtain the compressed image.

For example, prior to the step of compressing the initial image to obtain the compressed image, the program instructions when executed further cause the following step to be perfoimed: determining that the size of the initial image is above the size threshold. The program instructions when executed cause the step of compressing the initial image to obtain the compressed image to be performed in case that the size of the initial image is above the size threshold.

Each module of the image detection system according to the embodiments of the present disclosure may be implemented by the processor of the electronic device for performing the image detection according to the embodiments of the present disclosure executing the computer program instructions stored in the memory, or may be implemented by executing by a computer the computer instructions stored in the computer readable storage medium of the computer program product according to the embodiments of the present disclosure.

Although detailed description has been given to the exemplary embodiments with reference to the accompanying drawings, it should be noted that the foregoing embodiments are merely the illustrative of the present disclosure, and are not used to limit the present disclosure. Changes and modification may be made by those skilled in the art to these exemplary embodiments without departing from the scope and the spirit of the present disclosure. These changes and modifications are intended to fall within the scope of the present disclosure.

Those skilled in the art should understand that units and steps of the various examples described in connection with the embodiments of the present disclosure herein may be implemented by electronic hardware or a combination of computer software and electronic hardware. Whether these functions are performed in hardware or software depends on the specific application and design constraint conditions of the technical solutions. Those skilled in the art may use different methods to implement the described functions for each specific application, but the implementation should not be considered to go beyond the scope of the present disclosure.

It should be understood that in the several embodiments provided by the present application, the disclosed device and method may be implemented in other manners. For example, the device embodiments described above are merely illustrative, for example, the division of the unit is only a logical function division, and in actual implementations, there may be other division manners. Moreover, for example, multiple units or components may be combined or may be integrated into another device, or some features may be ignored or not executed.

In the description provided herein, many specific details are provided. However, it should be understood that the embodiments of the present disclosure may be practiced without these specific details. In some embodiments, the methods, structures and techniques which are known to those skilled in the art are not shown in detail, so as not to obscure the understanding of the present description.

Similarly, it should be understood that in order to simplify the disclosure and to help understand one or more aspect of the present disclosure, in the description of the exemplary embodiments of the present disclosure, the various features of the present disclosure are sometimes grouped together into a single embodiment, figure or the description thereof. However, the method of the present disclosure should not be explained to reflect the following intention: the present disclosure seeking protection requires more features than those recited in each claim. More specifically, as reflected in the corresponding claim, the inventive point is that the technical problems can be solved with fewer features than those of a disclosed embodiment. Therefore, the claims following the specific embodiments are hereby explicitly incorporated into the specific embodiments, wherein each of the claims is taken as a separate embodiment of the present disclosure.

It will be understood by those skilled in the art that all the features disclosed in the specification (including the accompanying claims, the abstract and the drawings) and any disclosed method, or all the processes or units of the device, may be combined in any combination, unless the features are mutually exclusive to each other. Each feature disclosed in the specification (including the accompanying claims, the abstract and the drawings) may be replaced by an alternative feature which is provided for the same, equivalent or similar purpose, unless expressly stated otherwise.

In addition, those skilled in the art should understand that, although some embodiments described herein include some but not other features which are included in other embodiments, combinations of features of different embodiments are intended to be within the scope of the present disclosure and to form different embodiments. For example, in the claims, any one of the claimed embodiments can be used in any combination.

Various component embodiments of the present disclosure may be implemented in hardware or in a software module which is running on one or more processors, or in a combination thereof. Those skilled in the art should understand that part or all of the functions of some modules of the image detection apparatus according to the embodiments of the present disclosure may be implemented in practice by a microprocessor or a digital signal processor (DSP). The present disclosure may further be implemented as a device program (e.g., a computer program and a computer program product) configured to perfoiui part or all of the methods described herein. In this way, the program of the present disclosure can be implemented to be stored in a computer readable medium, or can be in the foam of one or more signals. The signals may be downloaded from an Internet website, provided from a carrier signal, or provided in any other form.

It should be noted that the above-mentioned embodiments are illustrative of the present disclosure rather than limiting the present disclosure, and those skilled in the art may design alternative embodiments without departing from the scope of the appended claims. In the claims, any reference signs between parentheses shall not be construed as limiting the claim. The word 'comprising' not exclude the presence of elements or steps not listed in a claim. The word "a" or "an" preceding an element does not exclude the presence of a plurality of such elements. The present disclosure may be implemented by means of hardware comprising several distinct elements, and by means of a suitably programmed computer. In the unit claims enumerating several means, several of these means can be embodied by one and the same item of hardware. The words "first", "second" and "third", etc. do not indicate any ordering. These words are to be interpreted as names.

The above is merely specific embodiments or illustrative of specific embodiments of the present disclosure, and the protection scope of the present disclosure is not limited thereto. It will be apparent to those skilled in the art that various substitutions and modifications may be made without departing from the scope of the present disclosure. The protection scope of the present disclosure should be defined by the appended claims

What is claimed is:

1. An image detection method, comprising:
compressing an initial image to obtain a compressed image;
performing a target detection on the compressed image to obtain a first position information of a target object in the compressed image; and
determining a second position information of the target object in the initial image based on the first position information,
wherein the first position information comprises a coordinate of a first object frame for indicating a position of the target object in the compressed image, and
determining the second position information of the target object in the initial image based on the first position information comprises:
mapping the first object frame to the initial image, based on the coordinate of the first object frame and a compression ratio between the initial image and the compressed image, to obtain a second object frame in the initial image corresponding to the first object frame; and
obtaining a coordinate of the second object frame as the second position information.

2. The method according to claim 1, further comprising:
extracting an image block comprising the target object from the initial image based on the second position information; and
outputting the image block comprising the target object as an object image of the target object.

3. The method according to claim 1, wherein compressing the initial image to obtain the compressed image comprises:
compressing the initial image at a preset ratio to obtain the compressed image.

4. The method according to claim 1, wherein compressing the initial image to obtain the compressed image comprises:
compressing the initial image to a preset size to obtain the compressed image.

5. The method according to claim 1, wherein compressing the initial image to obtain the compressed image comprises:
resampling the initial image to obtain the compressed image.

6. The method according to claim 1, wherein prior to compressing the initial image to obtain the compressed image, the method further comprises:
determining that a size of the initial image is above a size threshold.

7. An image detection apparatus, comprising:
a compression module configured to compress an initial image to obtain a compressed image;
a detection module configured to perform a target detection on the compressed image to obtain a first position information of a target object in the compressed image; and
a position determining module configured to determine a second position information of the target object in the initial image based on the first position information,
wherein the first position information comprises a coordinate of a first object frame for indicating a position of the target object in the compressed image, and
the position determining module being configured to determine the second position information including the position determining module being further configured to:
map the first object frame to the initial image, based on the coordinate of the first object frame and a compression ratio between the initial image and the compressed image, to obtain a second object frame in the initial image corresponding to the first object frame; and
obtain a coordinate of the second object frame as the second position information.

8. An image detection system, comprising a processor and a memory,
wherein the memory stores a computer program instruction, and the computer program instruction when executed by the processor, causes the processor to perform the image detection method according to claim 1.

9. The image detection system according to claim 8, further comprising a camera, wherein the camera comprises an image sensor for capturing the initial image.

10. A non-volatile storage medium, storing a program instruction, the program instruction when executed by a computer, causing the computer to perform the image detection method according to claim 1.

* * * * *